United States Patent

[11] 3,607,629

| [72] | Inventors | Erling Frisch<br>Pittsburgh;<br>Harry N. Andrews, Monroeville, both of Pa. |
|---|---|---|
| [21] | Appl. No. | 700,121 |
| [22] | Filed | Jan. 24, 1968 |
| [45] | Patented | Sept. 21, 1971 |
| [73] | Assignee | Westinghouse Electric Corporation<br>Pittsburgh, Pa. |

[54] DRIVE MECHANISM FOR CONTROL ELEMENTS
10 Claims, 14 Drawing Figs.

[52] U.S. Cl. .................................................. 176/36,
92/15, 92/61, 91/411
[51] Int. Cl. ...................................................... G21c 7/16
[50] Field of Search .......................................... 92/15, 61;
91/411; 176/35, 36, 33, 34, 86

[56] References Cited
UNITED STATES PATENTS

| 3,347,747 | 10/1967 | West et al. ....................... | 176/35 |
| 2,665,555 | 1/1954 | Martinsson ..................... | 92/61 |
| 2,975,119 | 3/1961 | Emmons ......................... | 176/36 |
| 3,123,532 | 3/1964 | Michel ........................... | 176/36 |
| 3,178,356 | 4/1965 | Wheelock ....................... | 176/33 |
| 3,264,952 | 8/1966 | Winders ......................... | 176/36 |
| 3,372,622 | 3/1968 | Bullard ........................... | 92/61 |

*Primary Examiner*—Carl D. Quarforth
*Assistant Examiner*—Harvey E. Behrend
*Attorneys*—A. T. Stratton and Z. L. Dermer ABSTRACT: A nuclear reactor is disclosed wherein hydraulic drive mechanisms are provided to vary the location of a plurality of neutron-absorbing control elements associated with selected fuel assemblies. Each fuel assembly comprises a fixed array of commingled and spaced fuel pins and guide tubes. Each selected assembly has a plurality of individually movable two-position control elements which are coupled to drive mechanisms which operate to telescope the control elements within their associated guide tubes.

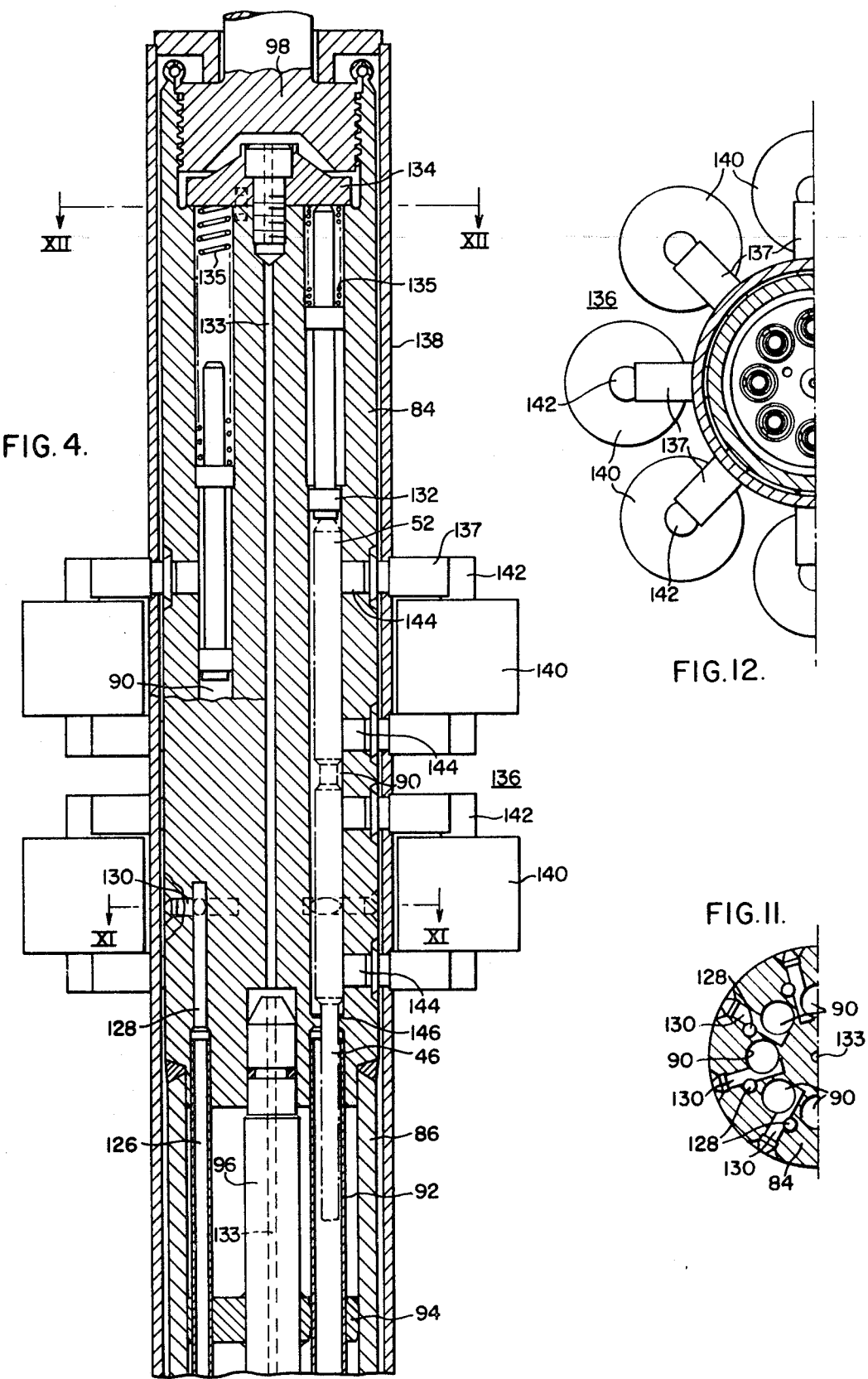

DRIVE MECHANISM FOR CONTROL ELEMENTS

BACKGROUND OF THE INVENTION

This invention pertains to control systems for nuclear reactors, and more particularly to the drive mechanisms for positioning discrete neutron-absorbing control elements.

In accordance with the present state of the art, certain power reactors are controlled by a combination of chemical shim system and rod cluster control (RCC) system. The RCC system generally comprises 39,489to 20 control or neutron-absorbing modules adapted to be telescoped within cooperating guide tubes in selected fuel assemblies. All of the modules associated with each of the selected fuel assemblies are attached to a single spider which is in turn attached to a common drive shaft. Thus, all of the modules are operated simultaneously in discrete steps over the entire distance of travel.

As indicated and explained in detail in copending U.S. Pat. application Ser. No. 700,153, filed of even date by R. French, and H. Andrews for a Nuclear Reactor (W.E. 39,489), and assigned to the present assignee, reactors utilizing RCC control or other incrementally movable control elements have several limiting characteristics. The worth of each control cluster is too great to be used for suppressing radial flux peaks. Partial insertion of a cluster can cause severe perturbations in the axial flux distribution and can lead to xenon cycling.

An optimum control system would accordingly have two primary characteristics. A wide dispersal of individually movable low-worth absorber modules, and no control configuration wherein certain control modules are partially inserted. Such a control system would result in appreciable savings due to more efficient usage of nuclear fuel.

A highly reliable drive mechanism which is capable of positioning a plurality of two-position control elements is necessary to render such a desirable control system practical. Previous attempts to design and utilize multielement drive mechanism had many obstacles to overcome. Large reactors which utilize a wide dispersal of control modules might contain 1,000 or more such modules. This means that 100 or more mechanisms capable of positioning a plurality of modules, in groups of 10 or more in this example, would be necessary. The individual mechanisms must not be so large that they cannot be mounted side by side on the reactor. Moreover, where attempts have been made to utilize the pressure inherent in many reactor systems to drive the control modules so as to effectuate size reductions, the amount of fluid flow necessary to hold a majority, say 600, of the modules in the withdrawn position was found to require prohibitively large pumps. Recently, it has been found that electromagnets are an effective and practical means for holding the modules in their withdrawn position. Electromagnets are also utilized to operate the valves for such a mechanism. The problem with placing a plurality of electromagnets in various locations on the housing of a mechanism is that some of the electromagnets are thereby rendered inaccessible for repair or replacement because of the close spacing necessary to mount, say 100, drive mechanisms on the rector.

A further problem with mounting mechanisms on a rector is that they are initially filled with air and during operation tend to accumulate various gases. Air or gas pockets greatly reduce the efficiency of such mechanisms, and greatly reduce desirable damping action. To reduce the danger of such accumulations, mechanisms of the prior art had bleeder valves mounted in such a position as to be operable from a safe location. These valves were opened periodically to relieve the gases. Continuous efficient operation, however, requires that these gases be continuously relieved.

It is accordingly among the objects of this invention to produce a drive mechanism which is capable of positioning a plurality of control modules, is not so large as to prohibit mounting a sufficient number on a rector, can be easily repaired, and does not accumulate gas.

SUMMARY OF THE INVENTION

The aforementioned requirements are met by a hydraulic mechanism which utilizes the substantial pressure available in PWR or other pressurized reactors to move the absorber modules relative to the stationary fuel assemblies with which they are associated. The pressure housing of each hydraulic mechanism is mounted on and through the head of the reactor so as to form a leak-tight seal. Interior of the pressure housing are a plurality of conduits or cylinders, each of which has a piston associated therewith. Drive rods are attached to the pistons and extend into the core region of the reactor. Each drive shaft has one or more absorber modules attached to it for telescoping movement into the guide tubes of stationary fuel assemblies. A variable source of pressure is associated with the cylinders to accomplish a reduction in pressure and allow the pistons to move into the cylinder due to the high constant pressure on the opposite side of each piston, or to increase the pressure to assist in scramming the neutron-absorbing control elements.

A support tube is mounted exterior of each pressure housing and is slidably engaged thereto. The support tube has a number of electromagnets mounted on its outward surface. One or more such electromagnets are associated with each cylinder at approximately the outward limit of travel of the associated pistons. Actuation of selected electromagnets holds the associated pistons at their outward or withdrawn position so that a differential pressure is not required to hold each withdrawn piston in this position.

Withdrawal of a control element, i.e., a number of absorber modules affixed to a single drive rod by a spider attachment, from its associated fuel assemblies is accomplished by utilizing the variable source of pressure to lower the force on the outward surface of the piston. This allows the higher force due to the pressure inherent in an operating PWR reactor to push the piston and its associated control element outwardly.

Selected control elements are inserted in the core by deactivating their associated electromagnets and equalizing the pressure outward of the piston. This then permits the control elements, attached to pistons which are not magnetically held, to be inserted by gravity into their associated fuel assemblies.

The elements which are most likely to fail during operation are mounted on the support tube. The pressure line from the variable source of pressure enters the pressure housing beneath the inward lip of the support tube. The support tube may therefore be easily removed from the pressure housing. The upper extremities of the cylinders are also in communication with the variable pressure line so as to remove any gas bubbles which would reduce damping of the upward moving pistons at the end of their withdrawal.

The combination of the above enumerated features constitutes a mechanism which allows a reactor to be controlled by a large and diverse pattern of low-worth two-position control elements and thus to more nearly achieve the full potential of its fissionable fuel. In accordance with the invention, a number of drive means each connected to a relatively small number of control modules are movable individually and independently of each other by a single control mechanism as contrasted with mechanisms of the prior art wherein each mechanism operates only one drive means.

DESCRIPTION OF THE DRAWINGS

For a better understanding of the invention reference may be had to the drawings, in which:

FIGS. 2, 3 and 4, taken end to end, show the drive mechanism of this invention wherein a piston is shown in FIG. 3 and in phantom in FIG. 4;

FIG. 11 is a cross-sectional view taken along line XI—XI of FIG. 4;

FIG. 12 is a cross-sectional view taken along line XII—XII of FIG. 4;

DESCRIPTION OF THE PREFERRED EMBODIMENT

Figure 1:
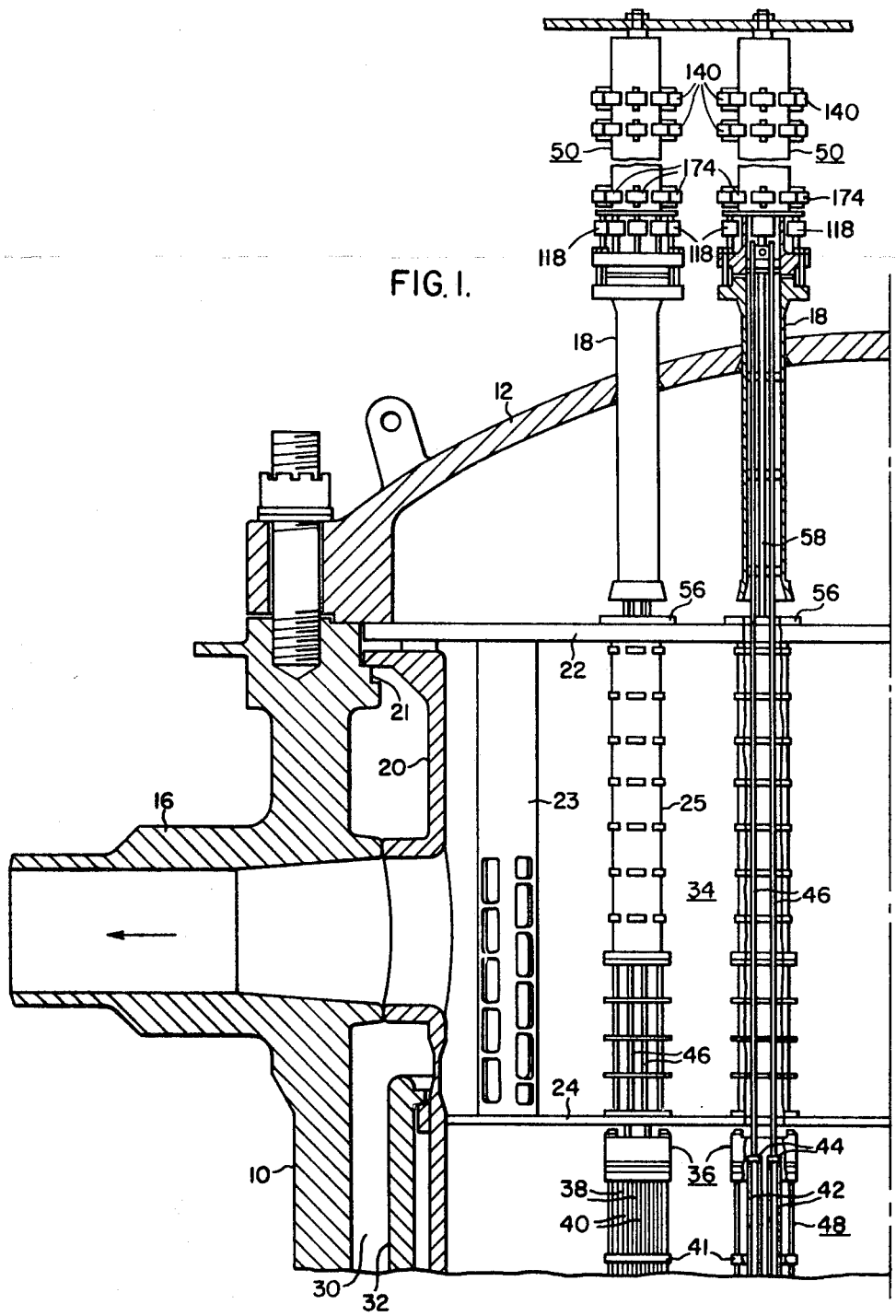
FIG. 1 is a sectional view of a portion of a nuclear reactor having widely dispersed individually movable two-position control elements.
Figure 2:
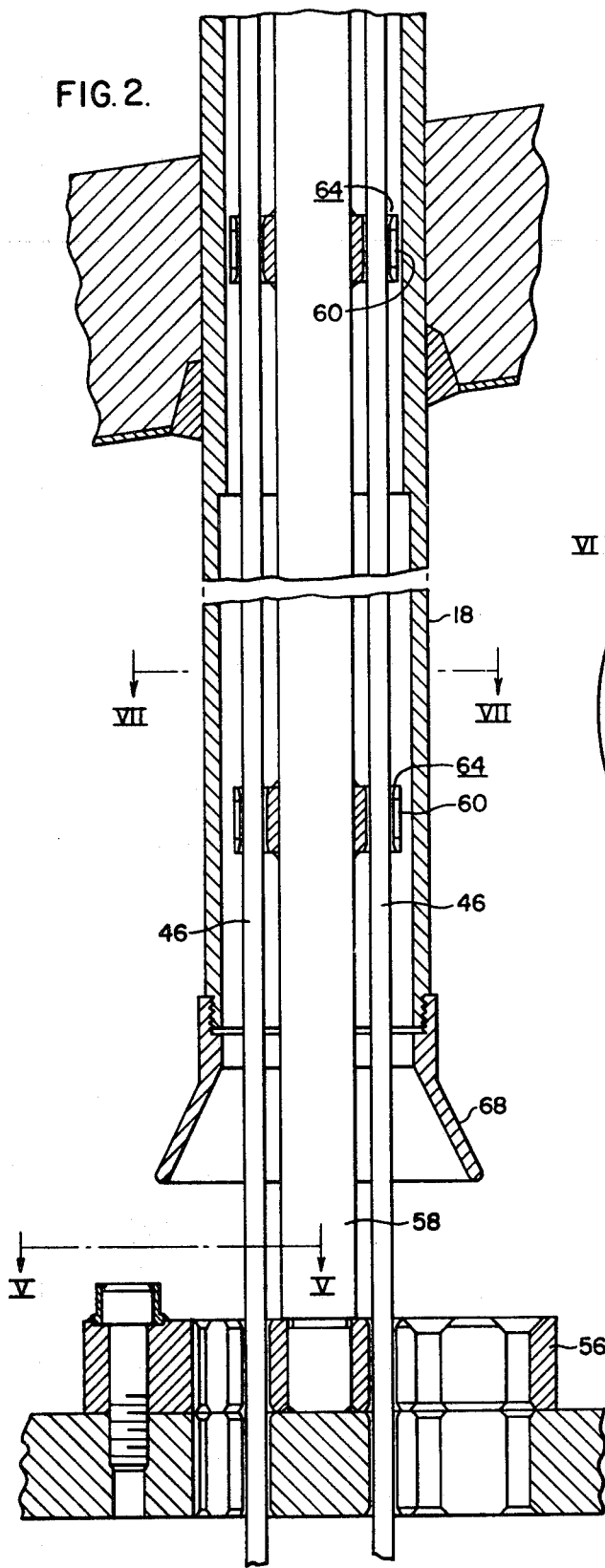

Referring to FIG. 1, there is illustrated a nuclear reactor incorporating the hydraulic drive mechanism of this invention. A pressure vessel 10 is shown which forms a tight pressurized container when sealed by head assembly 12. The pressure vessel 10 has coolant-flow-inlet nozzles (not shown) and coolant-outflow nozzles 16 in and through the cylindrical wall thereof. The head assembly 12 has a plurality of head penetration adapters 18 sealed in and through its substantially hemispherical wall. The axis of each head penetration adapter 18 is aligned parallel with the axis of the pressure vessel 10. A core barrel 20 is supportedly suspended from an inwardly extending projection 21 just below the top of the pressure vessel 10. An upper support plate 22 and an upper core plate 24 joined by columns 23 are substantially supported by the core barrel 20. A lower core plate (not shown) is also supported by the core barrel 20. Coolant flow entering through the inlet nozzles (not shown) proceeds to a bottom coolant manifold (not shown) through a flow annulus 30 formed by the lower wall of the pressure vessel 10 and the core barrel 20 as is well known in the art. The flow annulus 30 also contains a radiation shield 32. From the bottom coolant manifold, the flow proceeds generally axially upward through the fuel assemblies 36 supported between the core plates to an upper manifold region 34 from which it then proceeds through outlet nozzles 16 to energy-conversion structure (not shown).

The parallel array of fuel assemblies 36 include a plurality of fuel rods 38 and a plurality of guide tubes 40 symmetrically interspersed therebetween, and held in a fixed relationship each to the other by an egg-crate-type grid structure 41. This type of so-called canless fuel assembly is shown and described in a copending U.S. Pat. application Ser. No. 522,976, filed on May 25, 1964 by R. Creagan and E. Frisch for a fuel assembly for nuclear reactors, now continuation application Ser. No. 721,122, filed Apr. 12, 1968, and assigned to the present assignee. The guide tubes 40 serve as receptacles for absorber modules 42 as contemplated by this invention. For purposes of description 16 absorber modules 42 are shown per assembly (see FIG. 5), but this number may be changed to suit conditions.

The worth of a single absorber module 42 is so calibrated that the insertion of one or two such modules will not greatly change the power distribution of the entire core as would the insertion, for example, of a complete rod cluster control group. However, a single module 42 would have enough worth to reduce the flux density in its immediate environs.

Figure 5:
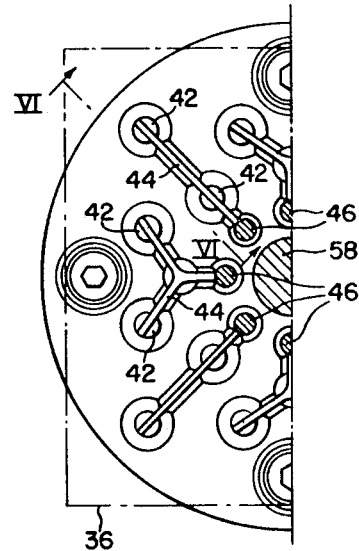
FIG. 5 is a cross-sectional view taken along line V—V of FIG. 2.
Figure 6:
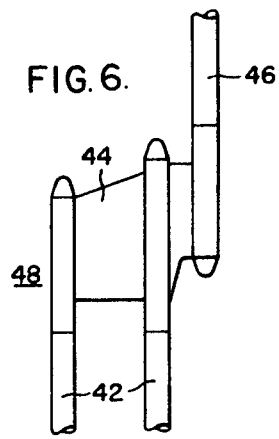
FIG. 6 is a view taken along line VI—VI of FIG. 5.

The location of absorber modules 42 relative to fuel assemblies 36 is shown in FIG. 5. The absorber modules 42 are joined in pairs at their upper ends to thin gusset plates 44 to which drive shafts 46 are also attached as can be seen more clearly in FIG. 6. As will be explained, each drive shaft 46 is designed for individual movement. Although two absorber modules 42 are shown attached to each drive shaft 46, only one might be used, or in the alternative more than two might be used to form each control element 48. Control elements 48 are not employed in all of the fuel assemblies 36 in this example. However, all the fuel assemblies 36 are identical and have the same number of guide tubes 40. The guide tubes for the fuel assemblies 36, which do not have control elements 48 associated therewith, may be plugged at the top to prevent coolant loss through the tubes.

In this embodiment, eight drive shafts 46 are associated with each selected fuel assembly 36 and are arranged in a circle about the center line of each assembly 36 and extend vertically upward into a drive mechanism 50 mounted on the reactor head assembly penetration adapter 18 on the same center line. Each mechanism 50 is designed to provide independent operation of the eight associated drive shafts 46 and their associated control elements 48.

Figure 3:
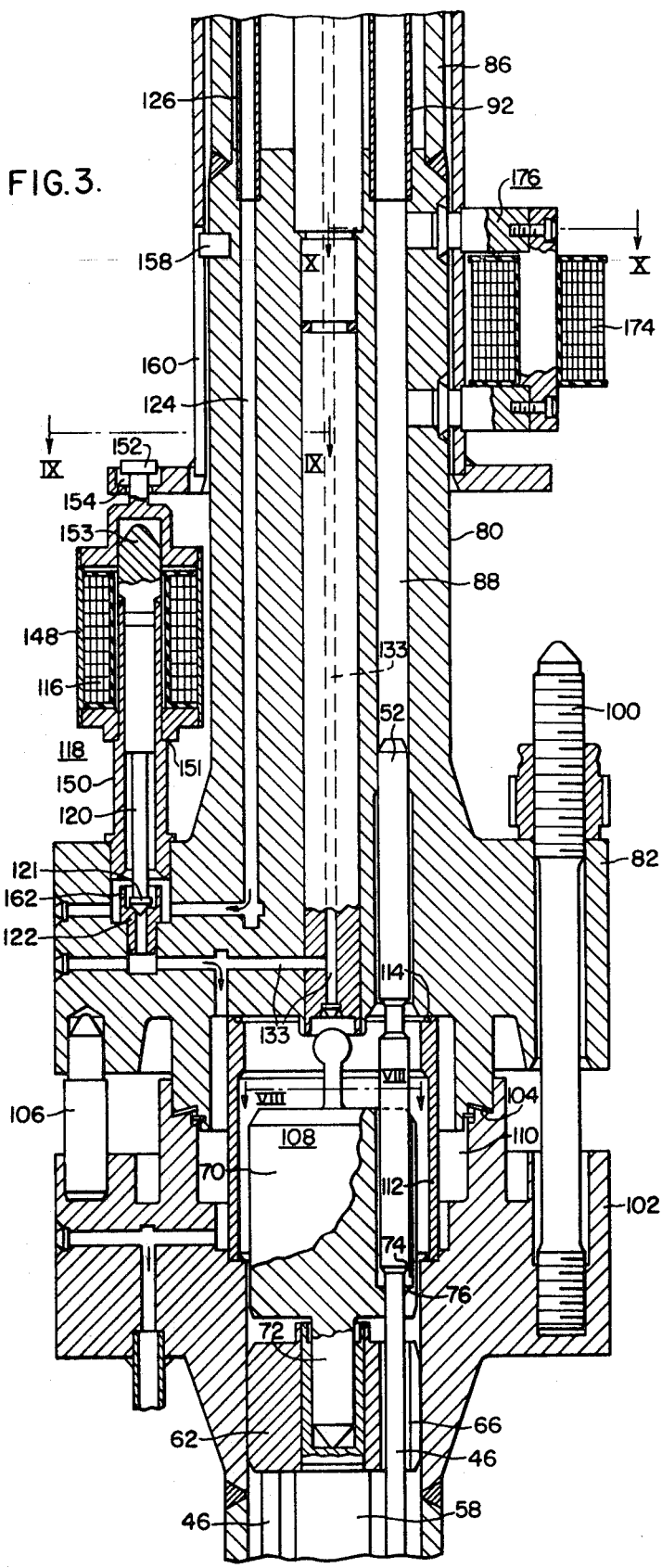
Figure 10:
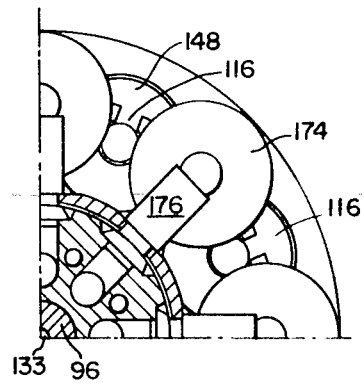
FIG. 10 is a cross-sectional view taken along line X—X of FIG. 3.
Figure 9:
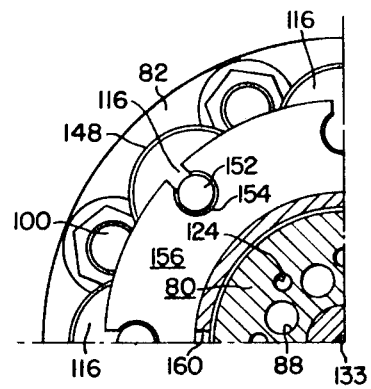
FIG. 9 is a cross-sectional view taken along line IX—IX of FIG. 3.
Figure 8:
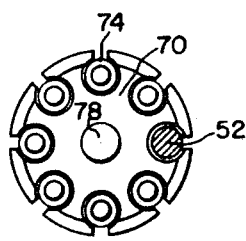
FIG. 8 is a cross-sectional view taken along line VIII—VIII of FIG. 3.

As may be seen in FIG. 3, the drive shafts 46 terminate in drive pistons 52 at their upper ends which operate in long cylindrical structures interior of the mechanism 50, as will be described. The pistons 52 are moved in the upward direction by hydraulic force using the coolant water as the hydraulic fluid and the inherent pressure in an operating pressurized water reactor as the driving force. The necessary pressure drop which may be on the order of 200 to 300 p.s.i. is produced by a pump or other suitable means outside of the reactor as will be described.

Figure 7:
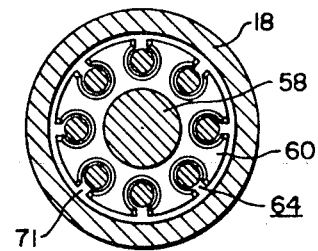
FIG. 7 is a cross-sectional view taken along line VII—VII of FIG. 2.

Drive shafts 46 are supported above the upper support plate 22 by a flange 56 to which is attached a vertical central shaft 58. Secured to the support shaft 58 by welding are several circular guide plates 60, spaced at regular intervals along the shaft 58, and a guide block 62 at the upper end. The guide plates 60 and the guide block 62 are provided with holes 64 and 66 respectively, to support and guide the drive shaft 46. It may be noted that in order to facilitate assembly of the reactor structure that funnels 68 are provided to slide over the central support shaft 58 and the guide plates 60 which is supported thereon. Radial slots 71 are also provided in the guide block 62 and the guide plates 60 to facilitate assembly (see FIG. 7). The central support shaft 58 possesses sufficient flexibility to compensate for any anticipated misalignment.

Resting on top of the fixed guide block 62 supported on central support shaft 58 is a cylindrical guide-block-lifting fixture 70 which is located on guide block 62 by means of a central pin 72 with a pointed end. The lifting fixture 70 is provided with eight vertical holes 74 with ledges 76 into which the drive shaft pistons 52 nest when the control rods are in their full inserted position. The pistons 52 in FIG. 3 are fractionally above their nested position. Any anticipated misalignment between the pistons 52 and their guide channels will be compensated for automatically by a slight rotation of the guide-block-lifting fixture 70 on its pointed pin 72. Because of the flexibility of the drive shafts 46 this last mentioned feature will obviate any jamming. It is to be noted that guide-block-lifting fixture 70 has a ball-shaped upper extension 78 attached thereto. The ball-shaped extension 78 may be grasped by a special lifting tool so that the captured pistons can be withdrawn from the reactor as will be later explained.

The above-delineated structure should be viewed as part of the reactor and its internals as will appear clear from a further study. Turning now to the drive mechanism 50, the drive-mechanism housing comprises a cylindrical base 80 having an outwardly extending flange 82 at its lower extremity and an upper cylindrical head cap 84 joined by welding to an intermediate heavy-walled tube 86. Cylinders for the drive rod pistons 52 are formed in the base 80 and the head cap 84 by drilling axial holes 88 and 90 respectively therein. Cylinders are provided interior of the intermediate tube 86 by long tubes 92 which are fixedly supported in tight counterbores in the opening of the holes 88 and 90. Between the counterbore supporting points, the long tubes 92 are anchored in guide disks 94. The guide disks 94 are in turn attached by welding or other suitable means to a central shaft 96 suspended between the base 80 and the cap 84. At the upper end, the mechanism interior is sealed off to form a pressurized housing by a threaded and seal welded plug 98 or other suitable means.

The drive mechanism housing is attached by studs 100 to the outwardly extending upper flange 102 of head-penetration adapters 18 and hermetically sealed by a high-pressure gasket 104. Accurate radial positioning is obtained by dowel pins 106. The central space 108 directly below the mechanism which is open to the pressure vessel interior carries a pressure in this example of approximately 2,000 p.s.i. This space is separated from a surrounding annular space 110 having a pressure in this example of approximately 1,700 p.s.i. by means of a tubular dam 112 and a metal O-ring gasket 114. In order to withdraw the control rod drive shafts 46 from the stationary fuel assemblies 36, the pressure in the cylinders above the drive pistons 52 must be lowered by connecting them hydraulically to the low-pressure annulus 110. This accomplished by energizing the coil 116 of magnetic valve 118 thereby lifting valve stem 120 and tip 121 from its seat 122. The connection from the valve 122 to the operating cylinder portion above the drive piston 52 is primarily through an axial hole 124 in the mechanism base 80 through a tube 126 interior of the intermediate tube 86 through a hole 128 in the head cap 86 and finally through a radially extending hole 130 to the upper end of a cylinder 90.

As a result of the differential pressure acting on the pistons 52 it and the associated control elements 48 will move at a rather high speed toward their fully withdrawn position. To lessen the shock upon reaching this final position, a shock absorber 132 is mounted in a long counterbore at the top of hole 90. The pistonlike shock absorber 132 is positioned against a lower stop 134 by a light spring 135. When the pistons 52 contact the shock-absorber piston 132 and moves it upward, water is substantially trapped above the piston 132 by the sealing stop 134. Some of this water is forced past the pistons 132 and produces a retarding force which is dependent upon the shock-absorbing piston clearance. The clearance and length of travel is selected so that the forces produced at no time cause a destructive effect upon the moving structure. It should be noted that the pistons 52 cannot be made self-damping since scram time would be greatly increased by the small clearance required for self-damping. Any gases which may be trapped above the shock absorber 132 is forced past the stop 143 into the open area between the stop 134 and the welded plug 98. This gas is then drawn through an evacuation line 133 to the exterior of the mechanism 50. The various pumping systems have a number of gas-extraction systems (not shown) connected to them to keep gas bubbles from forming in the coolant.

After a piston 52 has reached its upper limit of travel, it is held at this position by external electromagnets 136 and the magnetic valve 118 is deenergized so as to conserve the pumping potential of the system. Although two magnets are illustrated, one may be sufficient if the weight of the control rod and drive shaft is not too great. The electromagnets consist of two pole pieces 137 which are attached by welding to a nonmagnetic support tube 138 surrounding the mechanism housing and resting on top of the plug 98. As can be seen most clearly in FIG. 12, the inner faces of the pole pieces 137 are machined to obtain a close fit with the head cap 84. The magnetic coil 140 is mounted on a core 142 which is attached by screws or other suitable means to the pole pieces 137. The magnetic path to the control rod pistons 52, which are made of magnetic stainless steel or other suitable material, is completed by plugs 144 made of the same material. The plugs 144 may be threaded into the nonmagnetic head cap 84 and may be pressure sealed by welding. The holes 90 should be drilled and surface machined when the plugs are in place to obtain a close-fitting magnetic circuit. When the magnetic coils 140 are energized, the control rod pistons 52 are forced into contact with the wall of the holes 90 and are held in position by friction. As an additional precaution, a ledge 146 is provided in the cylindrical wall of the holes 90 to arrest any slippage of the pistons 52. Scramming of the control elements 48 may be accomplished simply by deenergizing the holding magnets and allowing the associated control rod structure to fall under the influence of gravity. The pressure above the pistons 52 may also be increased to decrease scram time, as will be explained.

The support tube 138 carries all of the magnetic structure associated with each mechanism and is an important feature of the design since it permits access to a failed coil. This would be very difficult if not an impossible task if the magnets 136 were mounted directly on the mechanism housing. This is easily realized when it is pointed out that the length of the mechanisms 50 for a large reactor may exceed 12 feet and that 70 or more such mechanisms may be mounted so closely together that the coils 140 of adjacent mechanisms 50 almost touch. Thus when it becomes necessary to replace a coil, according to this invention, the support tube 138 may be removed from above and a replacement tube with a full complement of magnets 136 may be lowered into place without appreciably disturbing the operation of the pressurized reactor. Replacement of the damaged coils or other defective means can then be made in leisure at a convenient location. In order to accommodate the support tube 138, it is necessary to mount the magnetic valves 118 on the lower extremity of the mechanism 50 as otherwise it would be impossible to remove the support tube 138. The valves 116 of the magnetic valve 118 are supported in housings 148 which are made of a magnetic steel or other suitable material and which fit over nonmagnetic steel pressure housings 150 from above and nest on a ledge 151. The pressure housings 150 are enclosed at top by welding to magnetic plugs 153. The housings 148 are provided with lifting knobs 152 at their upper end which fit into slotted counterbores 154 in the lower flanges 156 of the support tube 138. Therefore the valve coils 116 will be removed with the holding magnet coils 140 when support tube 138 is withdrawn. A locating pin 158 in the mechanism base 80 cooperates with a guide slot 160 in the support tube 138 to ensure correct alignment between the electrical elements when the tube 138 is brought into position. The pressure housings 150 may be threaded into the lower flange 82 of the mechanism 50 and may be sealed therein by any suitable means. The valve seats 122 may be secured by a pressure fit and it may be seen that the valve seat 122 has an upwardly directed tubular extension 162 which serves to direct the water flow in a direction parallel to the valve stem and prevents sideward thrust and possible sticking. This last-mentioned feature also serves to produce a slight downward force on the valve stem 120 and tip 121 so as to assist in the closing of the valve 118 when the coils 116 are deenergized. This force may be adjusted by varying the offset in the stem 120 directly above the valve tip 121.

Figure 13:
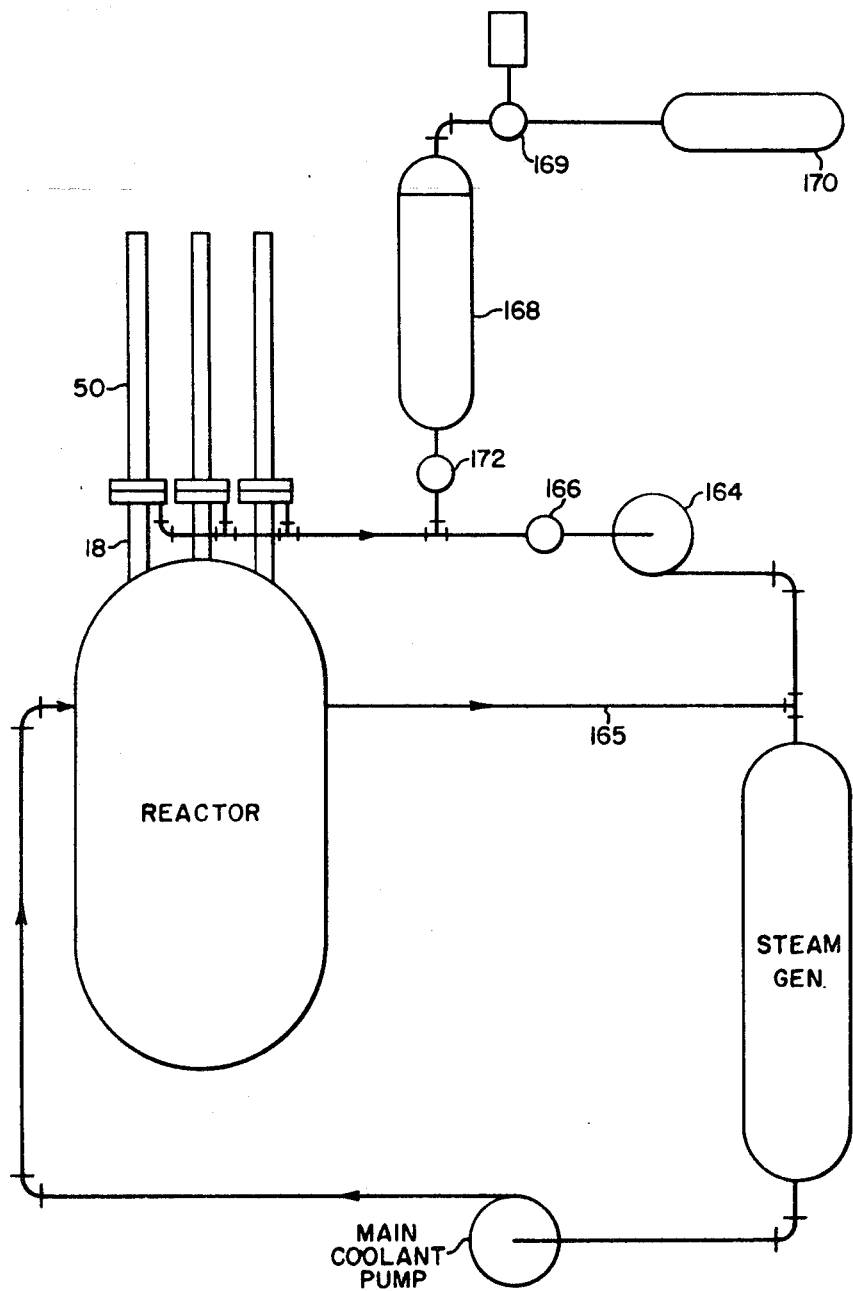
FIG. 13 shows a schematic view of a pressure system for driving control elements.

The 300 p.s.i. pressure drop exemplified as required to operate the control element pistons 52 is produced by a pump 164 or other suitable means connected as shown in the schematic diagram of FIG. 13. The suction side of the pump 164 is connected through a header arrangement to the low pressure annular region 110 of all the mechanisms for the reactor. The high pressure side of the pump is connected to the outlet pipe 165 of the reactor. A valve 166 is located between the suction side of the pump and the annular low pressure spaces 110 which is normally open thus producing a pressure of approximately 1,700 p.s.i. in the annular space 110. A high-pressure system comprising a high-pressure water tank 168, a pressure regulator 169, and a high-pressure supply source 170 may be connected to the pump line through a valve 172. The tank 168 may be charged with a pressure approximately 2,200 p.s.i. which is higher than that which would exist within the cylinders 90 below the pistons 52. This high-pressure system may then be used when desired to decrease the scram time of the control elements 48. Upon receipt of a scram signal, all holding magnets 136 are deenergized and in addition valve 166 is closed and valve 172 is opened. As a result, high-pressure water enters the mechanisms 50 where it causes automatic opening of all the magnet valves 118 and the creation of a high pressure in the cylinders 90 above the drive pistons 52 to increase the speed of control element 48 insertion.

By superimposing an AC signal on the DC current of the holding coils 140 which are located closely adjacent the topmost position of the pistons 52 it is possible to obtain an indication that the pistons are actually being fixedly held at their topmost position. The AC-coil current will increase considerably when and if a drive piston 52 drops below the magnetic poles 137. Similarly at the lower end of the mechanisms 50 another set of magnetic coils 174 which have pole pieces 176 are are constructed in the same fashion as the upper electromagnets 136 serve to indicate when the drive pistons 52 are fully inserted. The coils 174 are situated just above the lowermost position of the pistons 52 and indicate by utilizing AC current only when a piston has been fully inserted and is thus not closely adjacent the coils 174 and pole piece 176. For this purpose it is necessary that the entire drive shaft 46 be made of a magnetic steel. It is thus possible to ascertain whether any control element 48 is stuck between its fully inserted and fully withdrawn position and also which position it is in.

Figure 14:
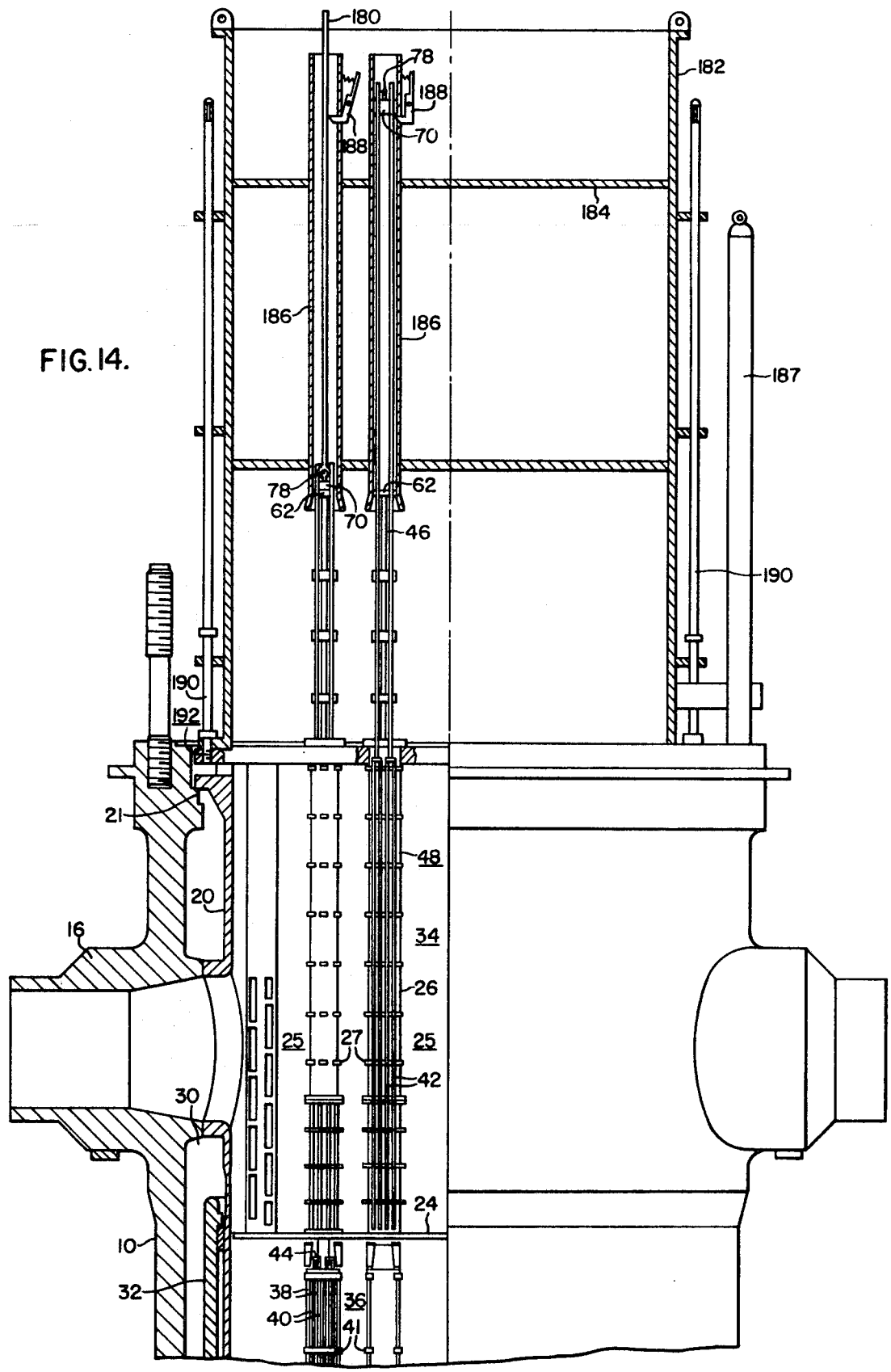
FIG. 14 is a view of the nuclear reactor being prepared for refueling and wherein the control elements are held in their withdrawn position just before all of the internals are removed to expose the fuel assemblies.

Before reactor refueling operations can commence, the head assembly 12 with the head penetration adapters 18 and the mechanisms 50 must be removed, the control elements 48 must be withdrawn from the core into the region of the upper support structure, and the entire upper support structure must be removed to gain access to the fuel assemblies. Referring to FIG. 14, the upper support structure comprises an upper support plate 22 and upper core plate 24 which are fixedly joined together by columns 23 and in addition comprises drive shaft guiding structures 25. The drive shaft guiding structure 25 essentially consists of a generally square vertical column 26 which has a number of guide plates 27 interspersed axially along it. The guide plates 27 are provided with radial slots to permit the passage of the control element gusset plates 44 when it is necessary to insert or remove a control element 48. For purposes of illustrating the removal of the upper structure, two fuel assemblies 36 are shown. The one on the left has the control elements 48 inserted therein while the one on the right has the control element 48 withdrawn into the region of the upper support structure. As may be seen, a special handling tool 180 is provided to lift the control elements 48 from their associated fuel assemblies 36. When the head assembly 12 and its associated structure are removed from the reactor, a large-flanged cylinder 182 is placed on the reactor. This cylinder 182 has two horizontal bulkheads 184 which have a number of long tubes 186 (one for each drive location) flared at their lower ends and fixedly supported therein. The inner diameter of the tube 186 is slightly larger than that of the upper guide-block-lifting fixture 70. When the cylinder 182 is lowered so that its flanges are supported on the upper support plate 22 using the reactor vessel guide studs 187 for accurate location, the guide blocks 70 slip into the flared openings of the tubes 186. Manipulation of the handling tool 180 causes it to couple on the ball extension 78 of the guide-block-lifting structure 70, and all the control elements 48 associated with a fuel assembly may then be withdrawn. A latching device 188 at the upper end of each tube 186 will hold the lifting fixture 70 and the control elements 48 in their fully withdrawn position until released. After all the control elements 48 are withdrawn, the upper core support structure to which the cylinders 182 are attached by long screws 190 tightened into holes 192 in the upper support plate 22 may be removed from the reactor vessel to a storage space. The removal of the upper support structure and the control elements 48 allows free access to the fuel assemblies 36.

It will therefore be apparent that there has been disclosed a drive mechanism 50 for control elements 48 which is capable of positively and quickly controlling a plurality of control elements 48 which are individually movable and which are designed to be either completely inserted or completely withdrawn from a reactor.

While there have been shown and described what are at present considered to be the preferred embodiments of the invention, modifications thereto will readily occur to those skilled in the art. It is not desired therefore, that the invention be limited to the specific arrangements shown and described. It is intended to cover in the appended claims all such modifications as fall within the true spirit and scope of the invention.

We claim as our invention:

1. a nuclear reactor comprising, in combination:
    a vessel subject to substantial internal pressure, said vessel having a nuclear core fixedly positioned therein;
    a plurality of fuel assemblies comprising said nuclear core, each of said fuel assemblies including a plurality of fuel rods and a plurality of control rod channels interspersed among said fuel rods;
    a plurality of pressure-bearing housings sealed in and through complementary apertures in a wall of said vessel and extending outwardly therefrom;
    a first set of conduits completely within each of said housing, each of said conduits being open to the substantial pressure within said vessel at one end;
    a piston within each said conduit;
    a drive shaft coupled to each piston and extending into the vessel;
    a plurality of control elements situated for telescoping movement within said control rod channels of selected fuel assemblies and coupled to said drive shaft; and
    means for individually supplying said conduits from a variable source of pressure at the other end for individual movement of the control rods.

2. The nuclear reactor of claim 1 wherein the means for individually supplying the conduits includes valve means connected between the variable source of pressure and each said conduit, and an individually operable actuating means for each said valve means whereby the pressure may be lowered to withdraw each of said control elements from the fuel assembly or raised to insert each of said control elements into the fuel assembly.

3. The nuclear reactor of claim 2 including electromagnetic means associated with each said piston at approximately the outward limit of its travel whereby each piston may be held at this position with utilizing the variable source of pressure.

4. The nuclear reactor of claim 3 including a second set of conduits within said pressure-bearing housing and situate parallel to said first set of conduits for conveying the variable pressure to said first set of conduits outward of said pistons.

5. The nuclear reactor of claim 4 including a support tube slidably engaging said pressure housing and having said electromagnetic means and said actuating means for said valve means mounted therein, a pressure-line-flow coupling said second set of conduits to said variable source of pressure, said pressure line being positioned in the pressure housing in such a manner as not to interfere with sliding movement of said support tube, whereby repair may be easily affected.

6. The nuclear reactor of claim 5 including a spring-biased pistonlike damping member within said first set of conduits and in proximity with the outward limit of travel of said pistons.

7. The nuclear reactor of claim 6 additionally comprising an evacuation line communicably coupled to the outward extremity of said first set of conduits and communicably coupled to said pressure line whereby entrapped gases may be removed from the first set of conduits.

8. The nuclear reactor of claim 1 wherein said control elements are movable to only two positions with respect to said guide tubes, said two positions being substantially fully inserted therein and substantially fully removed therefrom.

9. The nuclear reactor of claim 1 including a pump coupled to said means for individually supplying said conduits for providing the variable pressure, and a high pressure source and valve means coupled to said last-mentioned means for supplying high pressure from said source to said other end of said conduits.

10. The nuclear reactor of claim 3 including a direct-current source for energizing said electromagnetic means, and alternating-current source for superimposing an alternating signal on said electromagnetic means, and a detector magnetically coupled to said electromagnetic means for sensing whether the associated piston is being held whereby the position of the associated control element may be ascertained.